United States Patent
Müller et al.

(10) Patent No.: US 11,171,552 B2
(45) Date of Patent: Nov. 9, 2021

(54) CONNECTING A SHORT-CIRCUIT RING AND A CAGE BAR FOR A SQUIRREL CAGE

(71) Applicant: Siemens Aktiengesellschaft, Munich (DE)

(72) Inventors: Jörg Müller, Nüdlingen (DE); Alexandra Schneider, Heustreu (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/982,430

(22) PCT Filed: Feb. 7, 2019

(86) PCT No.: PCT/EP2019/052977
§ 371 (c)(1),
(2) Date: Sep. 18, 2020

(87) PCT Pub. No.: WO2019/179693
PCT Pub. Date: Sep. 26, 2019

(65) Prior Publication Data
US 2021/0083561 A1    Mar. 18, 2021

(30) Foreign Application Priority Data
Mar. 20, 2018   (EP) .................................. 18162859

(51) Int. Cl.
*H02K 17/16*   (2006.01)
*H02K 15/00*   (2006.01)

(52) U.S. Cl.
CPC ....... *H02K 17/165* (2013.01); *H02K 15/0012* (2013.01)

(58) Field of Classification Search
CPC ...... H02K 1/26; H02K 15/0012; H02K 17/16; H02K 17/18; H02K 17/20
USPC .................. 310/156.78–156.84, 211–212
See application file for complete search history.

(56) References Cited

U.S. PATENT DOCUMENTS

| | | |
|---|---|---|
| 995,469 A | 6/1911 | Knight |
| 1,371,569 A | 3/1921 | Mills |
| 1,371,570 A | 3/1921 | Mills |
| 2006/0066157 A1* | 3/2006 | Narayanan ......... H02K 15/0012 310/54 |
| 2012/0217837 A1 | 8/2012 | Kleber |

(Continued)

FOREIGN PATENT DOCUMENTS

| | | | |
|---|---|---|---|
| CN | 2 817 195 Y | 9/2006 | |
| DE | 10258029 A1 * | 7/2003 | ............. H02K 15/02 |
| DE | 10 2012 202 725 A1 | 11/2012 | |

(Continued)

OTHER PUBLICATIONS

Machine translation of DE-10258029-A1, retrieved from ESPACENET (Year: 2003).*

(Continued)

*Primary Examiner* — Quyen P Leung
*Assistant Examiner* — Minki Chang
(74) *Attorney, Agent, or Firm* — Henry M. Feiereisen LLC

(57) ABSTRACT

A short-circuit ring for a squirrel cage of a dynamoelectric rotary machine includes at least one indentation and is connectable by means of the indentation to at least one cage bar which projects from a rotor lamination of the dynamoelectric rotary machine.

8 Claims, 3 Drawing Sheets

(56) References Cited

U.S. PATENT DOCUMENTS

2013/0291373 A1* 11/2013 Meyer ................ H02K 15/0012
29/598
2017/0229932 A1* 8/2017 Simons ................. H02K 15/02

FOREIGN PATENT DOCUMENTS

| | | |
|---|---|---|
| DE | 10 2012 220 794 A1 | 5/2013 |
| GB | 231 462 A | 12/1925 |
| JP | H06 38469 A | 2/1994 |
| JP | H06 98510 A | 4/1994 |
| JP | H09 168264 A | 6/1997 |
| JP | 5 461940 B2 | 4/2014 |
| WO | WO 2019/174816 A1 | 9/2019 |

OTHER PUBLICATIONS

PCT International Search Report and Written Opinion of International Searching Authority dated Jan. 4, 2019 corresponding to PCT International Application No. PCT/EP2019/052977 filed Jul. 2, 2019.

* cited by examiner

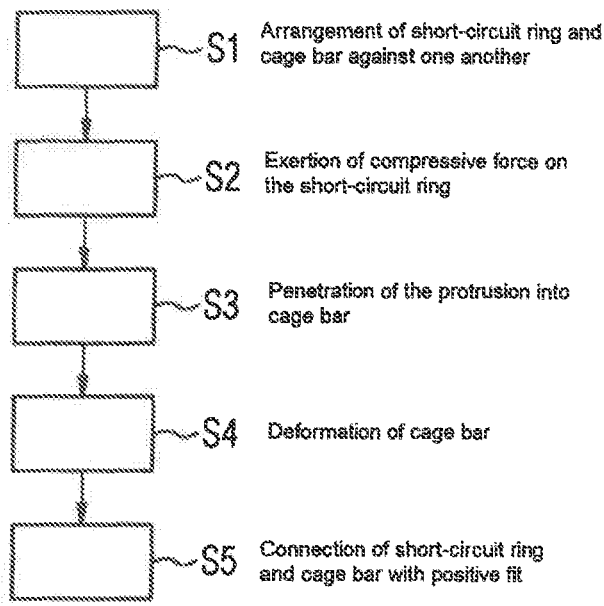
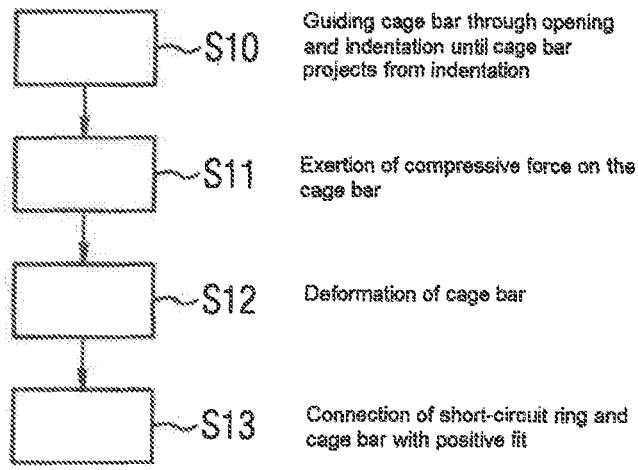

CONNECTING A SHORT-CIRCUIT RING AND A CAGE BAR FOR A SQUIRREL CAGE

CROSS-REFERENCES TO RELATED APPLICATIONS

This application is the U.S. National Stage of International Application No. PCT/EP2019/052977, filed Feb. 7, 2019, which designated the United States and has been published as International Publication No. WO 20191179693 A1 and which claims the priority of European Patent Application, Serial No. 18162859.5, filed Mar. 20, 2018, pursuant to 35 U.S.C. 119(a)-(d).

BACKGROUND OF THE INVENTION

The invention relates to a short-circuit ring for a squirrel cage of a dynamoelectric rotary machine, wherein the short-circuit ring has at least one indentation.

In order to form a squirrel cage, a short-circuit ring is conventionally connected to cage bars by means of soldering, in particular hard soldering, copper die casting or welding.

The disadvantage here, however, is that elaborate apparatuses are required for this purpose.

The object underlying the invention is that of simplifying the formation of a squirrel cage.

SUMMARY OF THE INVENTION

According to one aspect of the invention, the object is achieved by a short-circuit ring for a squirrel cage of a dynamoelectric rotary machine, wherein the short-circuit ring has at least one indentation, wherein the short-circuit ring can be connected, by means of the indentation, to at least one cage bar projecting from a rotor lamination of the dynamoelectric rotary machine.

According to another aspect of the invention, the object is achieved by a method for connecting a short-circuit ring of this kind to at least one cage bar, preferably with at least two cage bars, in order to form a squirrel cage, which method includes arranging short-circuit ring and the cage bar against one another, exerting compressive force on the short-circuit ring with a force effect at least substantially in the direction of the machine axis, penetrating the protrusion tapering to a point into the cage bar, deforming the cage bar by way of compression, and creating a positive-fit connection of short-circuit ring and cage bar.

According to still another aspect of the invention, the object is achieved by a method for connecting a short-circuit ring of this kind to at least one cage bar, preferably with at least two cage bars, to form a squirrel cage, which method includes guiding the cage bar through the opening and the indentation, until the cage bar projects from the indentation, exerting compressive force on the cage bar with a force effect at least substantially in the direction of the machine axis, deforming the cage bar by way of compression, and creating a positive-fit connection of short-circuit ring and cage bar.

Squirrel cages primarily find use in rotors of three-phase asynchronous machines.

Further advantageous embodiments emerge from the subclaims.

In an advantageous embodiment of the invention, the short-circuit ring can be connected to the cage bar by compressing the cage bar.

Preferably, the short-circuit ring has a first material, preferably copper, aluminum, steel or alloys thereof. Preferably, the cage bar has a second material which is softer than the first material, preferably an aluminum alloy or a copper alloy.

Aluminum or an aluminum alloy has a lower electrical conductivity than copper, but is cost-effective. Copper or a copper alloy has a high electrical conductivity, but is expensive. For high-performance dynamoelectric rotary machines, e.g. high torque motors, copper is advantageously used.

In a further advantageous embodiment of the invention, the short-circuit ring has at least two indentations, wherein a number of indentations corresponds to a number of cage bars.

Advantageously, the number depends on a slot count of the dynamoelectric rotary machine.

In a further advantageous embodiment of the invention, the indentation is embodied on a rear side of the short-circuit ring facing the rotor lamination.

In a further advantageous embodiment of the invention, a protrusion is embodied on a base area of the indentation.

In a further advantageous embodiment of the invention, the protrusion is embodied such that it tapers to a point.

In a further advantageous embodiment of the invention, a longitudinal axis of the protrusion is embodied at least substantially at right angles to the base area of the indentation.

In a further advantageous embodiment of the invention, the protrusion is able to pierce into the cage bar.

In a further advantageous embodiment of the invention, the protrusion is embodied as a pin.

The pin is advantageously a protrusion tapering to a point.

Furthermore, other forms are possible, e.g. a protrusion with two or more points.

In a further advantageous embodiment of the invention, the indentation is embodied on a front side of the short-circuit ring facing away from the rotor lamination.

In a further advantageous embodiment of the invention, an opening is embodied on a rear side of the short-circuit ring.

In a further advantageous embodiment of the invention, the opening is embodied on a base area of the indentation.

In a further advantageous embodiment of the invention, the base area of the indentation is larger than a base area of the opening.

In a further advantageous embodiment of the invention, the opening and the indentation are configured to receive the cage bar.

The method according to the invention for connecting a short-circuit ring to at least one cage bar, preferably to at least two cage bars, in order to form a squirrel cage comprises the following steps:

arranging short-circuit ring and cage bar against one another exerting compressive force on the short-circuit ring with a force effect at least substantially in the direction of the machine axis penetrating the protrusion tapering to a point into the cage bar deforming the cage bar by way of compression creating a positive-fit connection of short-circuit ring and cage bar Preferably, the short-circuit ring and the cage bar are arranged directly against one another.

Furthermore, the method is also suitable for a short-circuit ring which is spaced apart. In an advantageous embodiment, the short-circuit ring and the cage bar are arranged at a distance from one another. Advantageously, the cage bars have a length which enables the spaced-apart arrangement of the short-circuit ring. The already described steps of exerting compressive force on the short-circuit ring, penetrating the protrusion tapering to a point into the cage bar, deforming by way of compression and creating the positive-fit connection are also suitable for the connection of the short-circuit ring to at least one cage bar.

Preferably, the compressive force is applied to the short-circuit ring using a stamp. The stamp may also be designed as a plate, in particular a compression plate.

By way of the method, squirrel cages for rotors of asynchronous machines can only be joined by exerting force, in particular compressive force, by means of pressing.

The further method according to the invention for connecting a short-circuit ring to at least one cage bar, preferably to at least two cage bars, in order to form a squirrel cage comprises the following steps:
- guiding the cage bar through the opening and the indentation, until the cage bar projects from the indentation
- exerting compressive force on the cage bar with a force effect at least substantially in the direction of the machine axis
- deforming the cage bar by way of compression
- creating a positive-fit connection of short-circuit ring and cage bar In a further advantageous embodiment of the invention, the indentation is filled almost entirely, or entirely, by the deformed cage bar.

The compressed cage bar, however, may also be embodied as a rivet and reach out beyond the indentation.

Preferably, a short-circuit ring is attached at a front axial end of the rotor lamination and also at a rear axial end of the rotor lamination.

Preferably, the rotor lamination—preferably designed as a laminated core—comprises individual sheets with slots. By way of punch-bundling, the laminated core can be produced from individual sheets. Alternatively, the laminated core may be produced by stacking the sheets on a threading pin.

A number of slots preferably corresponds to the desired number of cage bars. The cage bars—preferably comprising aluminum, copper or alloys thereof—are drawn into the slots.

The invention offers the advantage of expensive tools and manufacturing plants not being required during the production of rotors of asynchronous machines. The invention enables a production associated with only little outlay. Furthermore, no further manufacturing means such as solder or copper or aluminum are required. It is additionally possible to save energy, as no heating of the solder is required for soldering or of the copper or aluminum for the connection by means of copper or aluminum die casting.

The invention is particularly well suited to low quantities of rotors.

Advantageously, the cage bars are introduced into the laminated core with a clearance fit and/or an interference fit. When connecting the short-circuit ring to a or to all cage bars, the laminated core is advantageously positively guided, so that the compressive force can be applied in an optimally distributed manner, i.e. advantageously in the direction of the machine axis.

The cage bars are advantageously introduced into slots of the laminated core. When applying the compressive force, they are advantageously only able to be deformed or compressed outside the laminated core, i.e. in the region which abuts the short-circuit ring.

This has the advantage that the laminated core cannot be displaced. Therefore, a twisting and/or deforming of the cage bars and/or the laminated core can be avoided.

BRIEF DESCRIPTION OF THE DRAWING

The invention is described and explained in more detail below on the basis of the exemplary embodiments shown in the figures, in which:

FIG. 7 shows an exemplary sequence of a method for connecting the short-circuit ring to at least one cage bar, FIG. 8 shows an exemplary alternative sequence of a method for connecting a short-circuit ring to at least one cage bar.

DETAILED DESCRIPTION OF PREFERRED EMBODIMENTS

Figure 1:
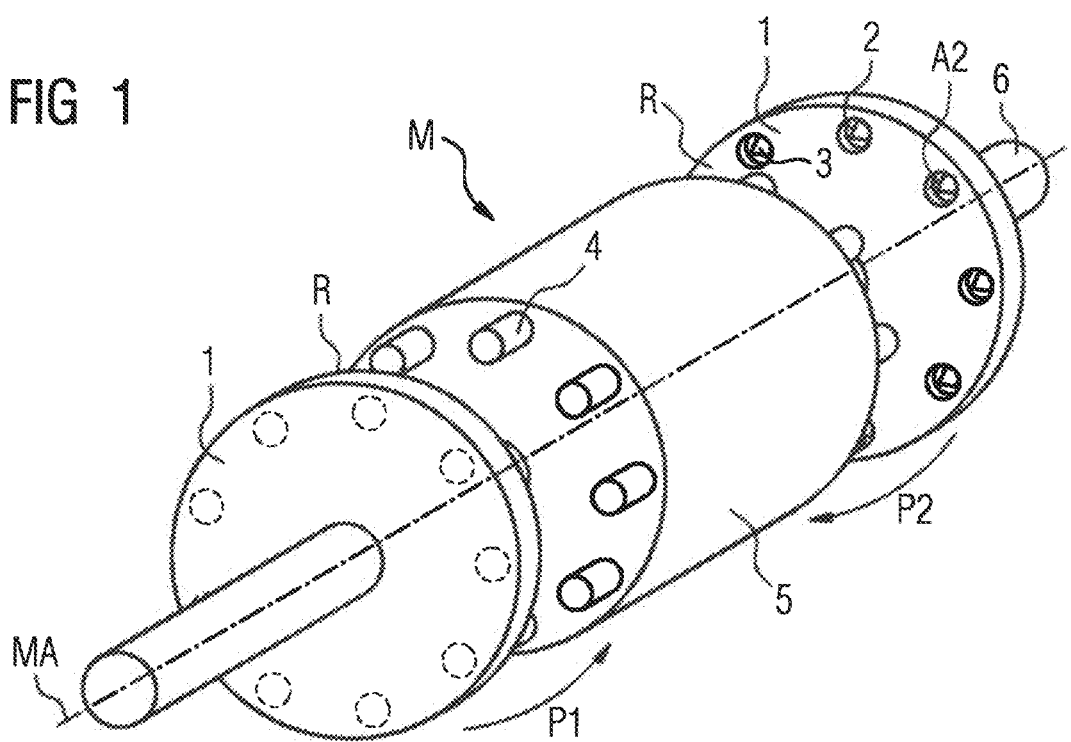
FIG. 1 shows a configuration of a short-circuit ring with an indentation, on the base area of which a pin is embodied.

FIG. 1 shows a configuration of a short-circuit ring 1 with an indentation 2, on the base area A2 of which a pin 3 is embodied.

The pin 3 is a preferred embodiment of a protrusion. The pin 3 is embodied such that it tapers to a point. A longitudinal axis LA of the pin is embodied at right angles to the base area A2 of the indentation 2 in the figure. In other words: the longitudinal axis LA (see FIG. 2) of the pin 3 is arranged in parallel with the machine axis MA in the figure.

The short-circuit ring 1 is part of a squirrel cage of a dynamoelectric rotary machine M. The short-circuit ring 1 is in particular part of the squirrel cage of a rotor of a machine M.

The indentation 2 serves to mechanically and electrically connect short-circuit ring 1 and at least one cage bar 4. In the figure, the cage bar 4 projects from a rotor lamination 5, preferably designed as a laminated core.

The cage bar 4 is preferably arranged in parallel with the machine axis. A skewed arrangement is also possible, however, i.e. that an angle between 0 and 90° exists between the machine axis and a longitudinal axis of the cage bar.

The cage bar 4 is compressed by compressive force being applied to the short-circuit ring 1, and the short-circuit ring 1 being pressed against the rotor lamination 5. This is represented by the arrows P1 and P2. The pin 3 pierces into one end of the cage bar 4.

This has the following advantages: a point of the pin in the cage bar 4 enables a precise positioning of the pin 3 on the cage bar 4. Because of the point, the short-circuit ring 1 is not able to be displaced during the pressing. Additionally, after the pressing, the connection is particularly durable and resistant, when the point is pierced into the cage bar 4.

The cage bar 4 advantageously has softer material than the short-circuit ring 1, in order for the compression to be successful.

The figure shows that a number of indentations 2 corresponds to a number of cage bars 4.

The indentations 2, including pin 3, are embodied on a rear side R of the short-circuit ring 1 in the figure. The rear side R is the side of the short-circuit ring 1 facing away from the rotor lamination.

In the figure, the rear side R is an area of the short-circuit ring 1 which abuts the rotor lamination 5 or, in the case of a spaced-apart short-circuit ring (not shown in the figure), points in the direction of the rotor lamination 5.

The figure additionally shows a shaft 6.

Figure 2:
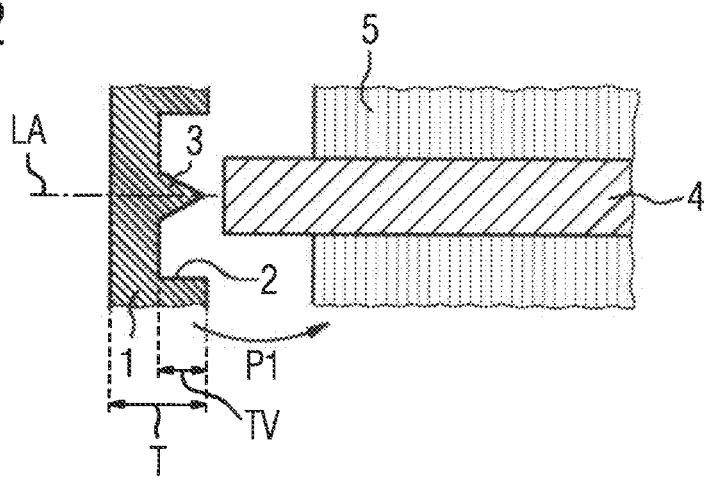
FIG. 2 shows a cut-out from FIG. 1.

FIG. 2 shows a cut-out from FIG. 1.

The short-circuit ring 1 is pressed against the rotor lamination 5 in the direction of the arrow P1. The pin 3 pierces into the cage bar 4. The cage bar 4 deforms or is compressed and fills the indentation 2.

Advantageously, the indentation has a depth TV of 10% to 90%, preferably of 40% to 60%, in relation to an overall depth T of the short-circuit ring 1.

The pin 3 is embodied in such a way that its point does not project beyond the rear side of the short-circuit ring 1. The pin may also, however, be embodied such that it projects beyond the rear side. Furthermore, the pin may also be embodied shorter, i.e. such that is does not reach the rear side.

Figure 3:
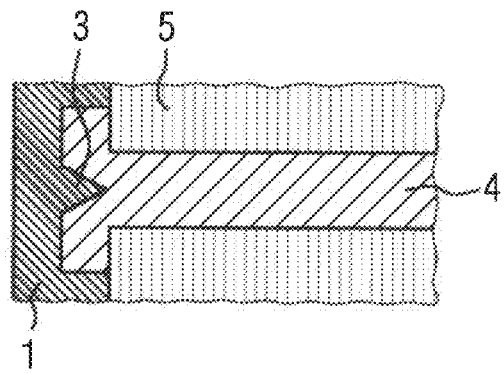
FIG. 3 shows a positive-fit connection of short-circuit ring and cage bar.

FIG. 3 shows a positive-fit connection of short-circuit ring 1 and cage bar 4.

The figure shows the connection once the cage bar 4 has been compressed, by compressive force having been applied to the short-circuit ring 1 and the short-circuit ring 1 having been pressed against the rotor lamination 5. The pin 3 pierced into the cage bar 4 accomplishes a resistant connection.

Figure 4:
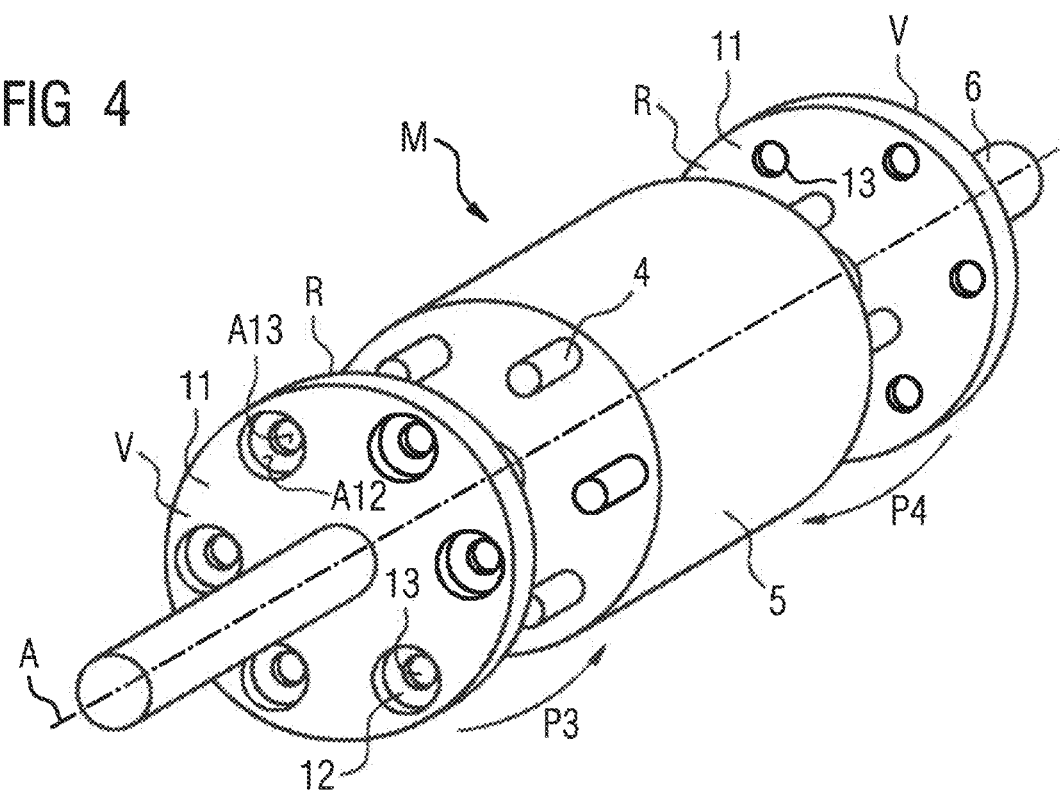
FIG. 4 shows a configuration of a short-circuit ring with an indentation on a front side of the short-circuit ring and an opening on a rear side of the short-circuit ring.

FIG. 4 shows a configuration of a short-circuit ring 11 with an indentation 12 on a front side V of the short-circuit ring 11 and an opening 13 on a rear side R of the short-circuit ring 11.

The front side V is the side of the short-circuit ring 11 facing away from the rotor lamination 5. The rear side R is the side of the short-circuit ring 11 facing the rotor lamination 5.

In the figure, the rear side R is an area of the short-circuit ring 11 which abuts the rotor lamination 5 or, in the case of a spaced-apart short-circuit ring (not shown in the figure), points in the direction of the rotor lamination 5.

The short-circuit ring 11 is part of a squirrel cage of a dynamoelectric rotary machine M. The short-circuit ring 11 is in particular part of the squirrel cage of the rotor of a machine M.

The figure additionally shows a shaft 6.

The indentation 12 serves to connect short-circuit ring 11 and at least one cage bar 4. In the figure, the cage bar 4 projects from a rotor lamination 5.

In the figure, the opening 13 abuts the indentation 12. A base area A12 of the indentation is larger than a base area of the opening A13 in the figure.

The cage bar 4 is received by the opening 13 and the indentation 12. The cage bar 4 has a particular length, so that it projects from the indentation 12 even after the short-circuit ring 11 has been placed on the rotor lamination 5 (see also FIG. 5 here).

The cage bar 4 is compressed by compressive force being applied to it, and by it being pressed against the rotor lamination 5. This is represented by the arrows P3 and P4. The pin 3 pierces into one end of the cage bar 4.

The cage bar 4 advantageously has softer material than the short-circuit ring 11, in order for the compression to be successful.

The figure shows that a number of indentations 12 corresponds to a number of cage bars 4.

Figure 5:
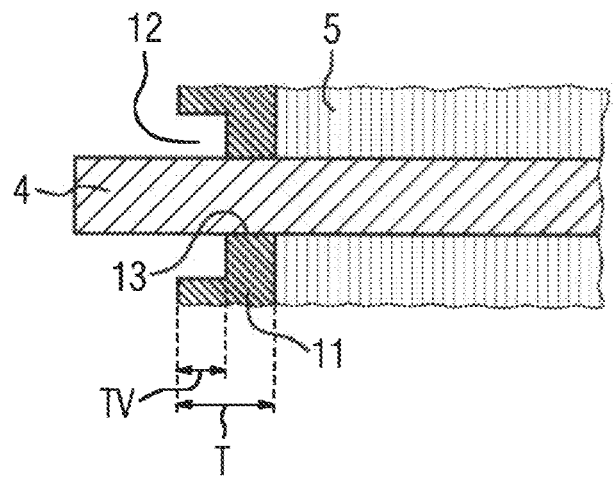
FIG. 5 shows a cut-out from FIG. 4.

FIG. 5 shows a cut-out from FIG. 4.

The short-circuit ring 11 is placed on the rotor lamination 5. The cage bar 4 projects beyond the short-circuit ring 11. In the figure, the cage bar 4 has at least substantially a diameter of the opening 13, for which reason these are already connected with a positive fit.

Advantageously, the indentation has the depth TV of 10% to 90%, preferably of 40% to 60%, in relation to the overall depth T of the short-circuit ring 1.

Pressure is applied to the cage bar 4. The cage bar 4 is compressed and fills the indentation 12.

Figure 6:
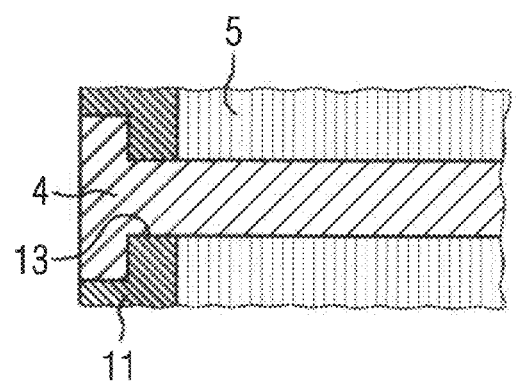
FIG. 6 shows a positive-fit connection of short-circuit ring and cage bar.

FIG. 6 shows a positive-fit connection of short-circuit ring 11 and cage bar 4.

The figure shows the connection once the cage bar 4 has been compressed by means of the application of compressive force and has been pressed against the rotor lamination 5.

FIG. 7 shows an exemplary sequence of a method for connecting the short-circuit ring to at least one cage bar.

Preferably, the short-circuit ring is connected to at least two cage bars and thus forms a squirrel cage. Nine cage bars are shown in FIG. 1 by way of example.

In a method step S1, the short-circuit ring and the cage bar are arranged against one another. Preferably, the short-circuit ring and the cage bar are arranged directly against one another. It is also possible, however, for the short-circuit ring to be spaced apart.

In a method step S2, compressive force is exerted, for example by means of a stamp, on the short-circuit ring 1 with a force effect at least substantially in the direction of the machine axis.

In a method step S3, the protrusion tapering to a point penetrates into the cage bar. In other words: the pin is pierced into the cage bar.

In a method step S4, the cage bar is deformed, in particular is compressed.

By means of the method, all cage bars are preferably connected to the short-circuit ring simultaneously, or at least almost simultaneously.

In a method step S5, short-circuit ring and cage bar are connected with a positive fit.

FIG. 8 shows an exemplary alternative sequence of a method for connecting a short-circuit ring to at least one cage bar.

Preferably, the short-circuit ring is connected to at least two cage bars and thus forms a squirrel cage. Six cage bars are shown in FIG. 4 by way of example.

In a method step S10, the cage bar is guided through the opening and the indentation, until the cage bar projects from the indentation. The short-circuit ring and the cage bar are assembled in this manner. Finally, the cage bar projects from the indentation.

Preferably, the short-circuit ring and the cage bar are arranged directly against one another. It is also possible, however, for the short-circuit ring to be spaced apart.

In a method step S11, compressive force is exerted, for example by means of a stamp, on the cage bar with a force effect at least substantially in the direction of the machine axis.

In a method step S12, the cage bar is deformed, in particular is compressed.

In a method step S13, the short-circuit ring and at least one cage bar are connected with a positive fit.

By means of the method, it is possible for just one cage bar to be connected to the short-circuit ring. In this context, the method is repeated until multiple, preferably all cage bars are connected to the short-circuit ring. It is also possible, however, to apply compressive force to all cage bars simultaneously.

Advantageously, the short-circuit rings at both ends of the rotor are connected to the cage bars in the same way (either the method shown in FIG. 7 or the method shown in FIG. 8). The methods described, however, may also be combined with one another or also with other methods.

The invention claimed is:

1. A short-circuit ring for a squirrel cage of a dynamoelectric rotary machine which includes a rotor lamination and a cage bar projecting from the rotor lamination, said short-circuit ring comprising an indentation via which the short-circuit ring is connectable to the cage bar, and a protrusion embodied on a base area of the indentation, wherein the protrusion defines a longitudinal axis extending substantially at a right angle to the base area of the indentation and is shaped to taper to a point, thereby enabling the protrusion to pierce into the cage bar.

2. The short-circuit ring of claim 1, wherein the short-circuit ring is connectable to the cage bar by compressing the cage bar.

3. The short-circuit ring of claim 1, wherein the short-circuit ring includes a plurality of said indentation at a number which corresponds to a number of said cage bar.

4. The short-circuit ring of claim 1, wherein the indentation is embodied on a rear side of the short-circuit ring in facing relation to the rotor lamination.

5. The short-circuit ring of claim 1, wherein the protrusion is embodied as a pin.

6. A method for connecting a short-circuit ring to a cage bar in order to form a squirrel cage of a dynamoelectric rotary machine, said method comprising:

arranging the short-circuit ring and the cage bar against one another;

exerting a compressive force on the short-circuit ring substantially in a direction of a machine axis of the dynamoelectric rotary machine, penetrating a pointed protrusion of the short-circuit ring into the cage bar, deforming the cage bar by way of compression; and creating a positive-fit connection of the short-circuit ring and the cage bar.

7. The method of claim 6, wherein the short-circuit ring and the cage bar are connected with a positive fit.

8. The method of claim 6, wherein the protrusion is embodied on a base area of an indentation of the short-circuit ring, with the cage bar filling the indentation almost entirely or entirely, as the cage bar is deformed.

* * * * *